United States Patent
Farooq et al.

(10) Patent No.: US 12,447,924 B2
(45) Date of Patent: Oct. 21, 2025

(54) AIRBAG INFLATABLE UNDER VEHICLE HOOD

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/310,745

(22) Filed: May 2, 2023

(65) Prior Publication Data
US 2024/0367607 A1 Nov. 7, 2024

(51) Int. Cl.
*B60R 21/36* (2011.01)

(52) U.S. Cl.
CPC .................................... *B60R 21/36* (2013.01)

(58) Field of Classification Search
CPC ...................................................... B60R 21/36
See application file for complete search history.

(56) References Cited

U.S. PATENT DOCUMENTS

| | | | |
|---|---|---|---|
| 3,731,949 A * | 5/1973 | Radke | B60R 21/232 182/138 |
| 6,182,782 B1 * | 2/2001 | Matsuura | B60R 21/36 180/274 |
| 6,189,960 B1 * | 2/2001 | Mumura | B60J 7/0015 180/281 |
| 6,386,623 B1 * | 5/2002 | Ryan | B60R 21/38 296/193.11 |
| 7,150,496 B2 | 12/2006 | Fujimoto | |
| 9,016,425 B1 * | 4/2015 | Choi | B60R 21/36 180/274 |
| 9,346,432 B2 | 5/2016 | Sugimoto et al. | |
| 9,771,048 B2 * | 9/2017 | Min | B60R 21/2338 |
| 10,246,044 B2 | 4/2019 | Barbat et al. | |
| 11,014,525 B2 | 5/2021 | Kanno et al. | |
| 11,766,990 B1 * | 9/2023 | Farooq | B60R 21/36 180/274 |
| 2003/0213635 A1 * | 11/2003 | Ryan | B60R 21/36 180/274 |
| 2004/0074690 A1 * | 4/2004 | Sato | B60R 21/2338 180/274 |
| 2004/0262894 A1 * | 12/2004 | Kempf | B60R 21/36 180/274 |

(Continued)

FOREIGN PATENT DOCUMENTS

| | | |
|---|---|---|
| DE | 102020106288 B3 | 6/2021 |
| JP | 2008143301 A | 6/2008 |

(Continued)

*Primary Examiner* — Paul N Dickson
*Assistant Examiner* — Shams Dhanani
(74) *Attorney, Agent, or Firm* — Frank A. MacKenzie; Brooks Kushman P.C.

(57) ABSTRACT

A vehicle includes a hood having a vehicle-rearward end and a vehicle-forward end. An airbag is disposed below the vehicle-rearward end of the hood and is inflatable to the vehicle-forward end below the hood. A pyrotechnic actuator is disposed below the vehicle-forward end of the hood. A tether extends from the pyrotechnic actuator to the airbag.

15 Claims, 7 Drawing Sheets

(56) References Cited

U.S. PATENT DOCUMENTS

| | | | |
|---|---|---|---|
| 2007/0023222 A1* | 2/2007 | Okamoto | B60R 21/36 |
| | | | 180/274 |
| 2009/0127016 A1* | 5/2009 | Hayashi | B60R 21/36 |
| | | | 180/274 |
| 2013/0200603 A1* | 8/2013 | Bergenheim | B60R 21/2338 |
| | | | 280/762 |
| 2013/0333972 A1 | 12/2013 | Rydsmo et al. | |
| 2014/0158450 A1* | 6/2014 | Hasselblad | B60R 21/38 |
| | | | 180/274 |
| 2016/0023629 A1* | 1/2016 | Park | B60R 21/36 |
| | | | 180/274 |
| 2017/0232926 A1 | 8/2017 | Barbat et al. | |
| 2019/0001919 A1 | 1/2019 | Farooq et al. | |
| 2019/0084521 A1 | 3/2019 | Farooq et al. | |
| 2019/0366971 A1* | 12/2019 | Nakamura | B60R 21/36 |
| 2020/0331424 A1* | 10/2020 | Cord | B60R 21/2644 |
| 2022/0063551 A1* | 3/2022 | Haltom | B60R 21/36 |
| 2022/0274558 A1* | 9/2022 | Farooq | B60R 21/36 |

FOREIGN PATENT DOCUMENTS

| | | | |
|---|---|---|---|
| JP | 2009234319 A | | 10/2009 |
| WO | 0198118 A2 | | 12/2001 |
| WO | 2018173514 A1 | | 9/2018 |

* cited by examiner

AIRBAG INFLATABLE UNDER VEHICLE HOOD

BACKGROUND

A vehicle may include an airbag deployable during certain vehicle impacts to absorb energy from a pedestrian outside of the vehicle during certain vehicle impacts. The airbag may be a component of an airbag assembly including a housing supporting the airbag, and an inflation device in communication with the airbag for inflating the airbag from an uninflated position to an inflated position.

DETAILED DESCRIPTION

Figure 1:
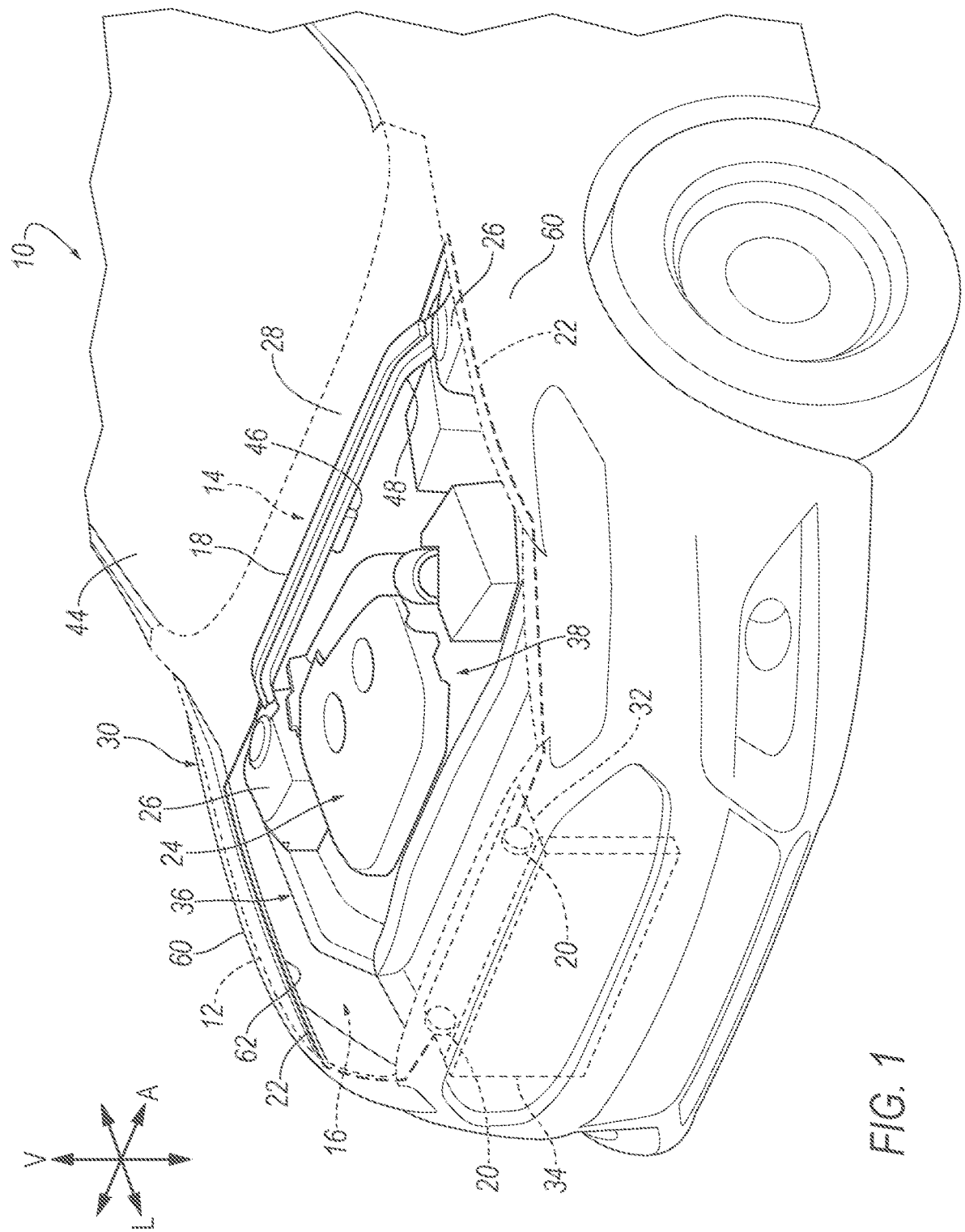
FIG. 1 is a perspective view of a vehicle with a hood shown in hidden lines and an airbag in an uninflated position.

With reference to the Figures, wherein like numerals indicate like parts throughout the several views, a vehicle 10 includes a hood 12 having a vehicle-rearward end 14 and a vehicle-forward end 16. An airbag 18 is disposed below the vehicle-rearward end 14 of the hood 12 and is inflatable to the vehicle-forward end 16 below the hood 12. A pyrotechnic actuator 20 is disposed below the vehicle-forward end 16 of the hood 12. A tether 22 extends from the pyrotechnic actuator 20 to the airbag 18.

Figure 7:
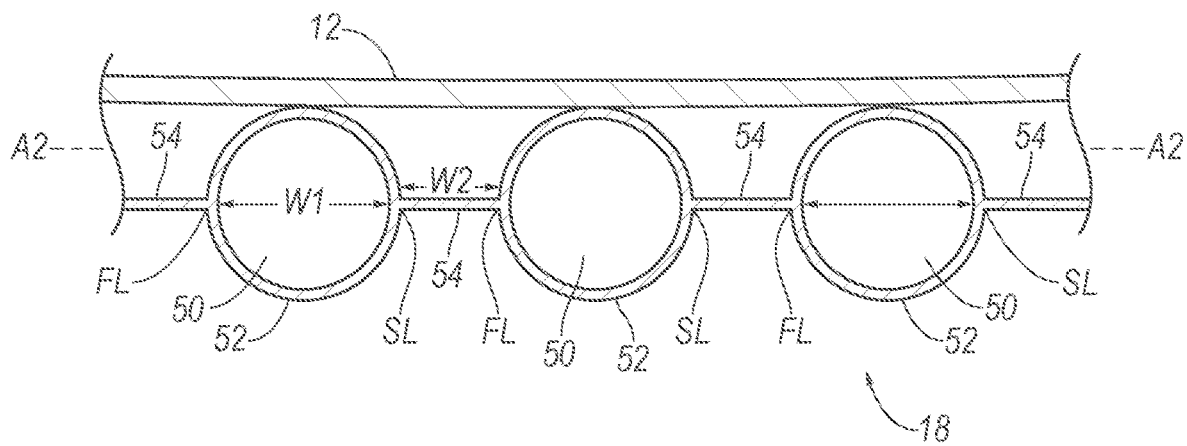
FIGS. 7-9 are examples of the airbag in cross-section.
Figure 8:
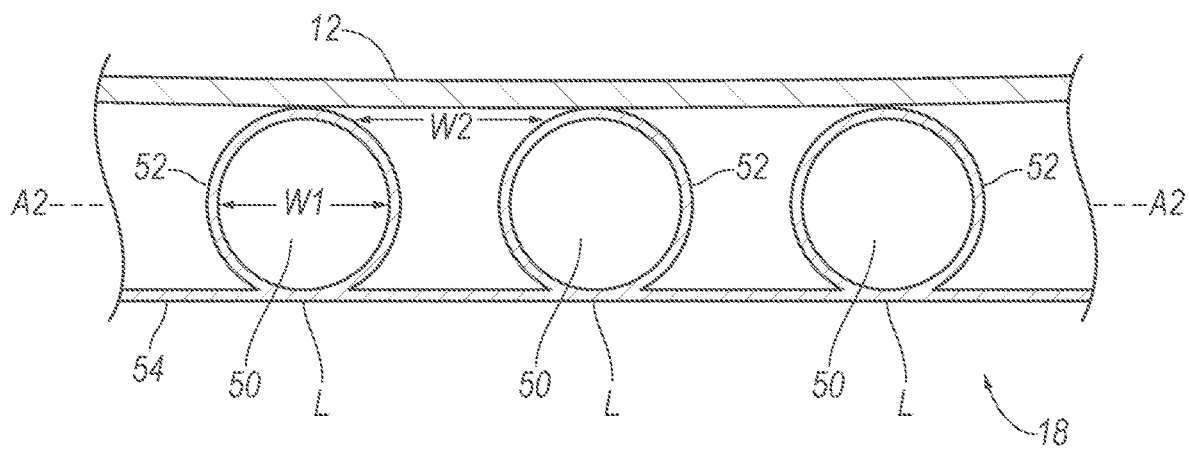
Figure 9:
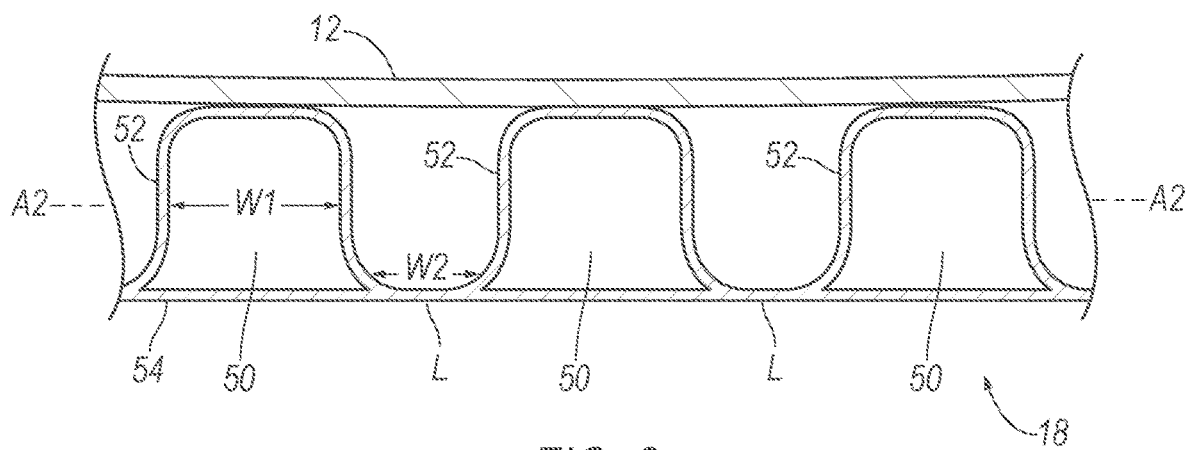

The packaging of the airbag 18 on the vehicle-rearward end 14 of the hood 12 reduces packaging constraints in the design of the vehicle hood 12 and the airbag 18. The position of the pyrotechnic actuator 20 below the vehicle-forward end 16 of the hood 12 similarly reduces packaging constraints. The tether 22 extending from the pyrotechnic actuator 20 to the airbag 18 allows for the separate packaging of the airbag 18 and the pyrotechnic actuator 20, i.e., below the vehicle-rearward end 14 and the vehicle-forward end 16, respectively, and deployment the airbag 18 below the hood 12 in the event of certain pedestrian impacts. Specifically, the pyrotechnic actuator 20 retracts the tether 22 to pull the airbag 18 across the hood 12 below the hood 12. When deployed and inflated below the hood 12, during certain pedestrian impacts the airbag 18 controls the kinematics of the pedestrian. Specifically, when deployed and inflated, the airbag 18 is below the hood 12 between the pedestrian and vehicle components that are rigid relative to the hood 12, e.g., vehicle-powertrain components 38 (such as an engine 24, electric-vehicle batteries and/or components, etc.), a shock tower 26, a cowl 28, etc., to control the kinematics of the pedestrian with respect to the vehicle components. Three examples of the airbag 18 with different inflatable members 52 and uninflatable panels 54 are shown in FIGS. 7-9. Common numerals are used to identify common features in FIGS. 7-9.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

The vehicle 10 includes a vehicle body 30. As one example, the vehicle body 30 may be of a unibody construction in which the vehicle body 30 and vehicle frame are unitary. As another example, the vehicle body 30 and vehicle frame may have a body-on-frame construction (also referred to as a cab-on-frame construction). In other words, the vehicle body 30 and vehicle frame are separate components, i.e., are modular, and the vehicle body 30 is supported on and affixed to the vehicle frame. In other examples, the vehicle body 30 and/or vehicle frame may have any suitable construction. The vehicle body 30 and/or the vehicle frame may be of any suitable material, for example, steel, aluminum, etc.

The vehicle body 30 includes body panels (not numbered). The body panels may include structural panels, e.g., rockers, pillars, roof rails, etc. Some of the structural panels may include, for example, a radiator mount 32 that supports a radiator 34, the shock tower 26 for mounting vehicle-suspension components, the cowl 28, etc. The body panels may include exterior panels. The exterior panels may present a class-A surface, e.g., a finished surface exposed to view by a customer and free of unaesthetic blemishes and defects. The body panels include, e.g., roof panels, fenders 60, etc.

The vehicle body 30 may have a powertrain compartment 36 designed to support and house vehicle components, including vehicle-powertrain components 38 of a vehicle powertrain. The vehicle powertrain in the powertrain compartment 36 may be, for example vehicle-powertrain components 38 such as an internal combustion engine 24, transmission, electric-vehicle batteries, energy-transmission hardware for electric-vehicle operation, etc. The hardware for electric-vehicle operation may include, for example, battery assemblies and/or components of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), or battery electric vehicles (BEVs). The powertrain compartment 36 may house components of the vehicle 10 such as a radiator 34, a windshield 74 washer system, air heating and cooling systems, steering and/or suspension components (e.g., shocks, struts, etc.), etc.

The powertrain compartment 36 is directly beneath the hood 12. In other words, for at least a portion of the powertrain compartment 36 and the hood 12, no other components are disposed between the powertrain compartment 36 and the hood 12. The vehicle components under the hood 12 may be rigid relative to the hood 12. In other words, during certain pedestrian impacts, the hood 12 deforms more easily than the vehicle components under the hood 12.

The hood 12 may be supported the vehicle body 30. In other words, the weight of the hood 12 is borne by the vehicle body 30. The hood 12 may be pivotable relative to the vehicle body 30 between a closed position, as shown in FIGS. 1, 3, 4, and 6, and an open position. The hood 12 covers the powertrain compartment 36 in the closed position.

Figure 6:
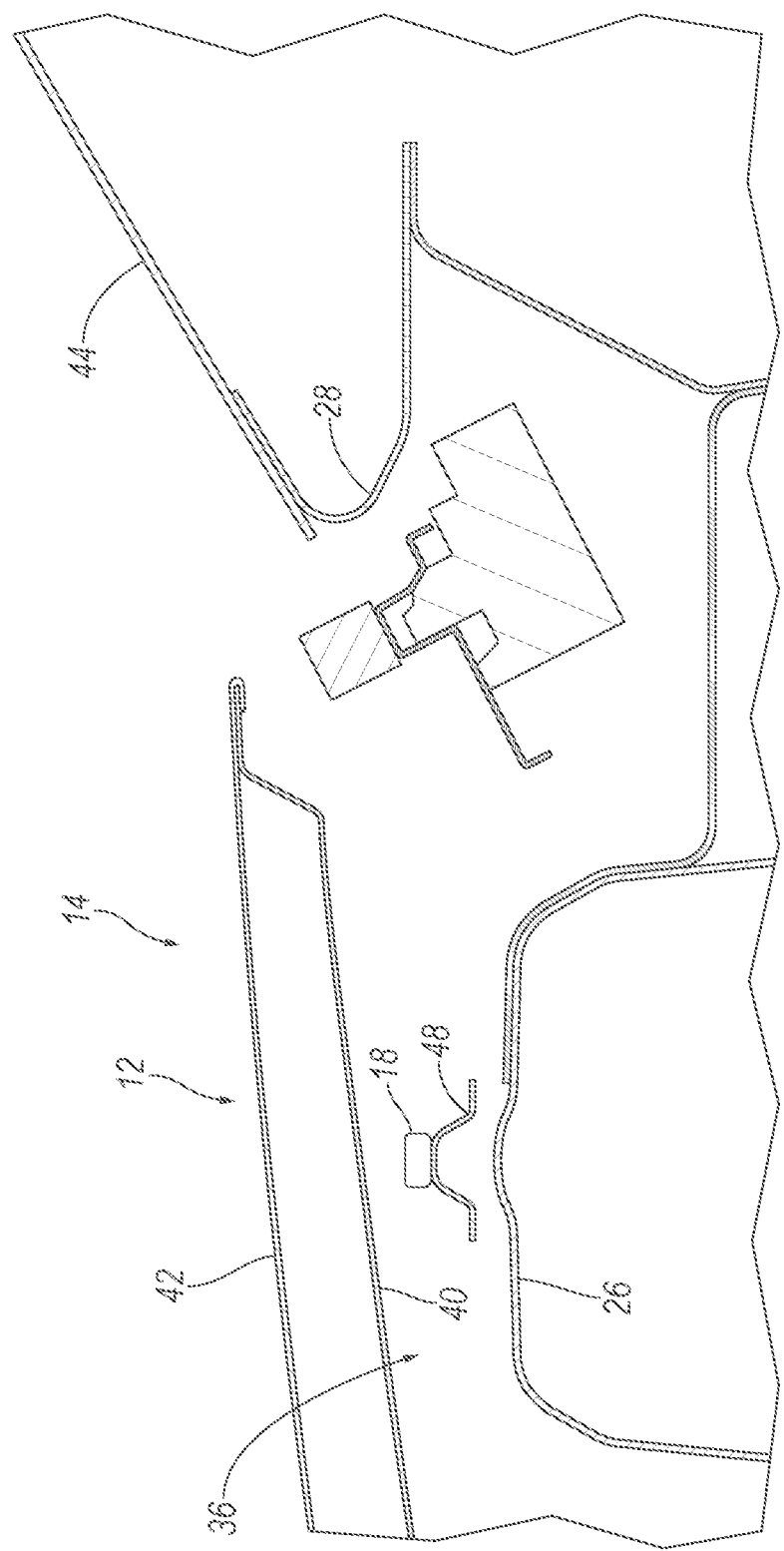
FIG. 6 is a cross-sectional view of the vehicle with the airbag in the uninflated position.

The hood 12 may include an inner panel 40 and an outer panel 42, as shown in FIG. 6. The inner panel 40 is closer to the powertrain compartment 36 than the outer panel 42. The outer panel 42 may provide an exterior class-A surface to the vehicle 10, i.e., a surface specifically manufactured to have a high quality, finished aesthetic appearance free of blemishes. The inner panel 40 may be secured to the outer panel 42, e.g., with one or more fasteners, via welding, etc. The inner panel 40 faces the powertrain compartment 36. The inner panel 40 and the outer panel 42 may be the same type of material or different types of material. For example, the inner panel 40 and the outer panel 42 may be metal, e.g., aluminum, steel, etc. As another example, the inner panel 40 and/or outer panel 42 may be plastic, for example, sheet molding composite (SMC), carbon fiber reinforced plastic (CFRP), fiberglass, and/or other fiber reinforced plastic.

The vehicle-forward end 16 of the hood 12 is vehicle-forward of the vehicle-rearward end 14 along the longitudinal axis L. The vehicle-rearward end 14 is a portion of the hood 12 adjacent a windshield 74 and the vehicle-forward end 16 is a portion of the hood 12 opposite the vehicle-rearward end 14 along the vehicle-longitudinal axis L. The vehicle-rearward end 14 terminates at a vehicle-rearward edge that is the rearward-most edge of the hood 12. The vehicle-forward end 16 terminates at a vehicle-forward edge that is the forward-most edge of the hood 12.

The windshield 74 is made of transparent material, e.g., glass, plexiglass, etc. The windshield 74 protects occupants of the vehicle 10 while permitting such occupants to see through the windshield 74. The windshield 74 may be supported by front pillars.

The cowl 28 supports various vehicle components such as the hood 12, the windshield 74, a dashboard, etc. The cowl 28 may be located between the passenger cabin and the powertrain compartment 36. The cowl 28 may include an external surface.

Figure 3:
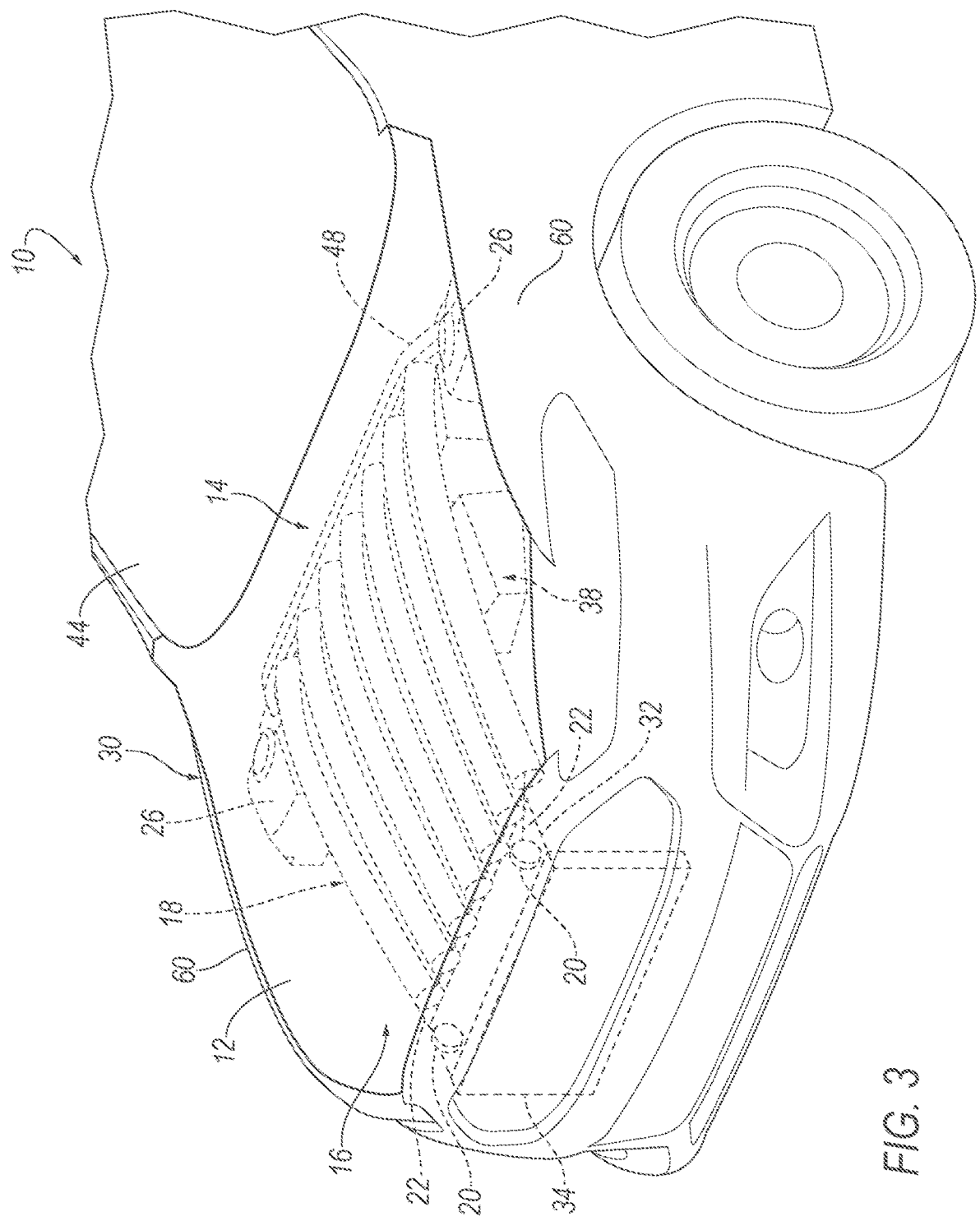
FIG. 3 is a perspective view of the vehicle with the airbag in an inflated position.
Figure 4:
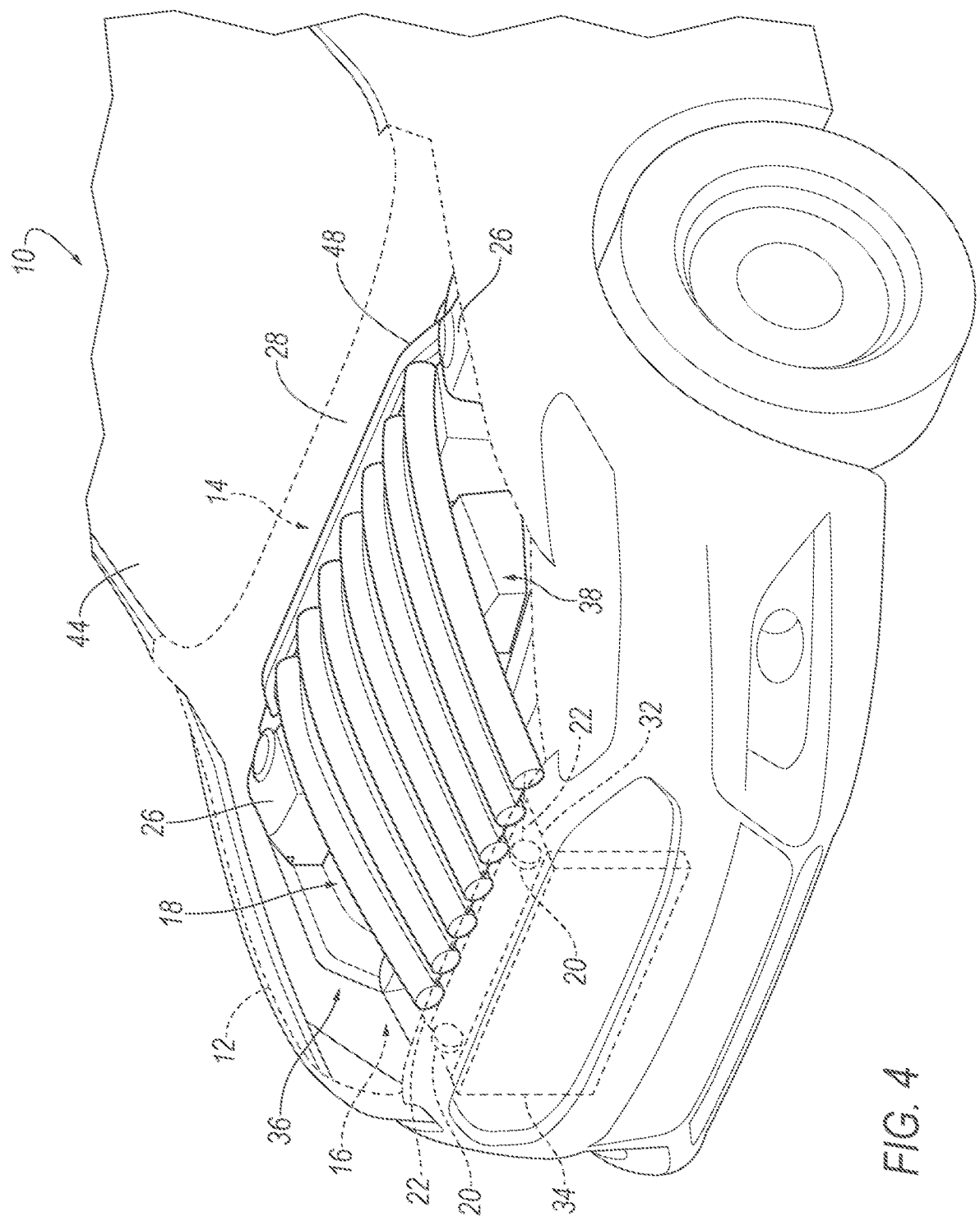
FIG. 4 is the perspective view of FIG. 3 with the hood in hidden lines.
Figure 5:
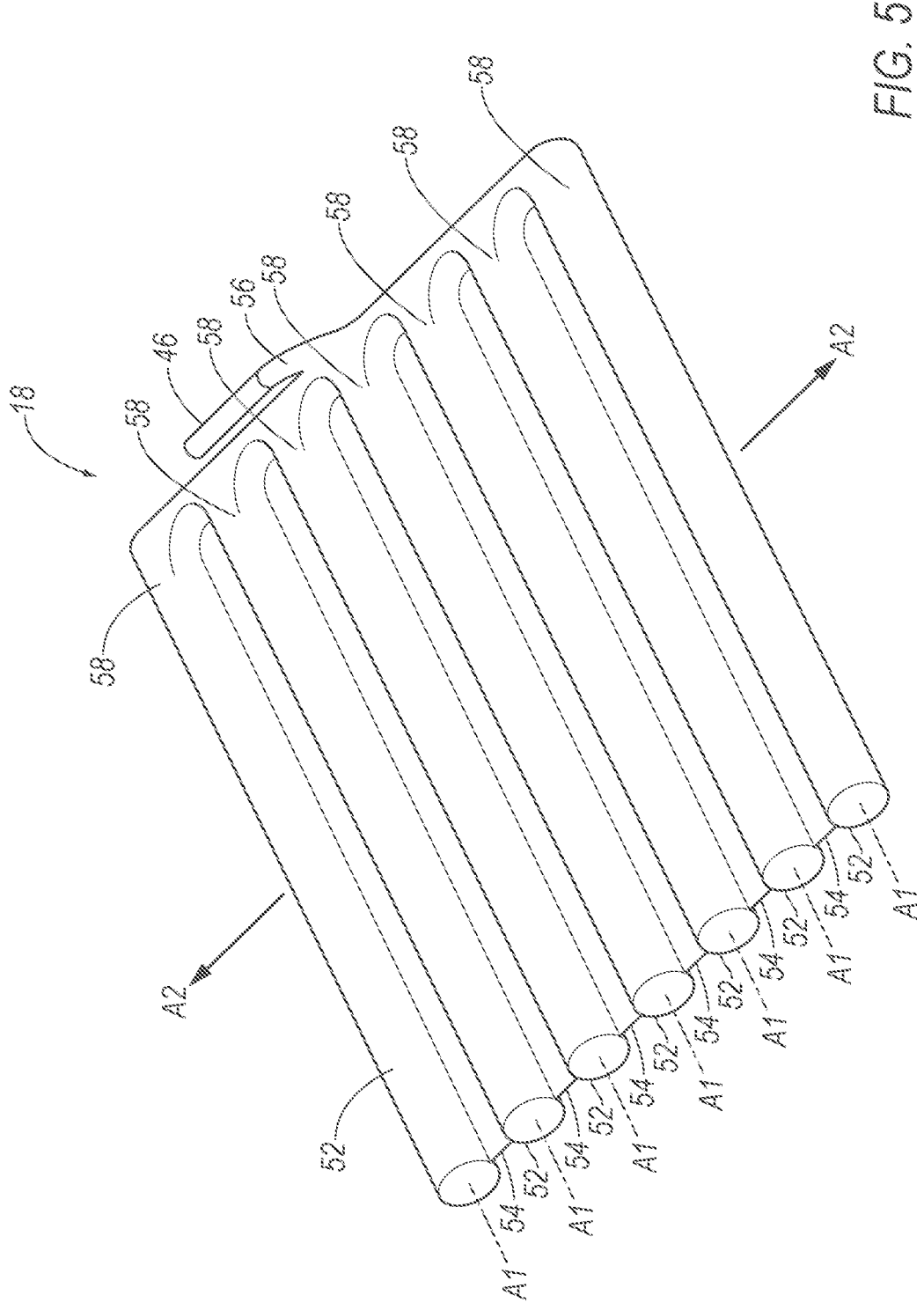
FIG. 5 is a perspective view of the airbag in the inflated position.

The vehicle 10 includes an airbag 18 assembly, which includes the airbag 18 and an inflator 46. The inflator 46 inflates the airbag 18 from an uninflated position, as shown in FIG. 1, to an inflated position, as shown in FIGS. 3-5. In the example shown in the figures, the airbag 18 and the inflator 46 are mounted directly to the vehicle body 30. In other examples, the airbag 18 assembly may include an airbag 18 housing that houses the airbag 18 in the uninflated position and supports the airbag 18 in the inflated position. In such examples, the airbag 18 may be rolled and/or folded to fit within the airbag 18 housing in the uninflated position. The airbag 18 housing may be of any suitable material, e.g., a rigid polymer, a metal, a composite, or a combination of rigid materials.

As described further below, the airbag 18, the inflator 46, and the pyrotechnic actuator 20 are fixed to the vehicle body 30. In other words, the airbag 18, the inflator 46, and the pyrotechnic actuator 20 are mounted to the vehicle body 30 at a location that is immoveable relative to the vehicle body 30. The airbag 18, the inflator 46, and/or the pyrotechnic actuator 20 may be fixed directly to the vehicle body 30 or indirectly to the vehicle body 30, i.e., with intermediate components therebetween. The airbag 18 includes inflatable members 52 inflatable to an inflated position and uninflatable panels 54, as described further below.

Figure 2:
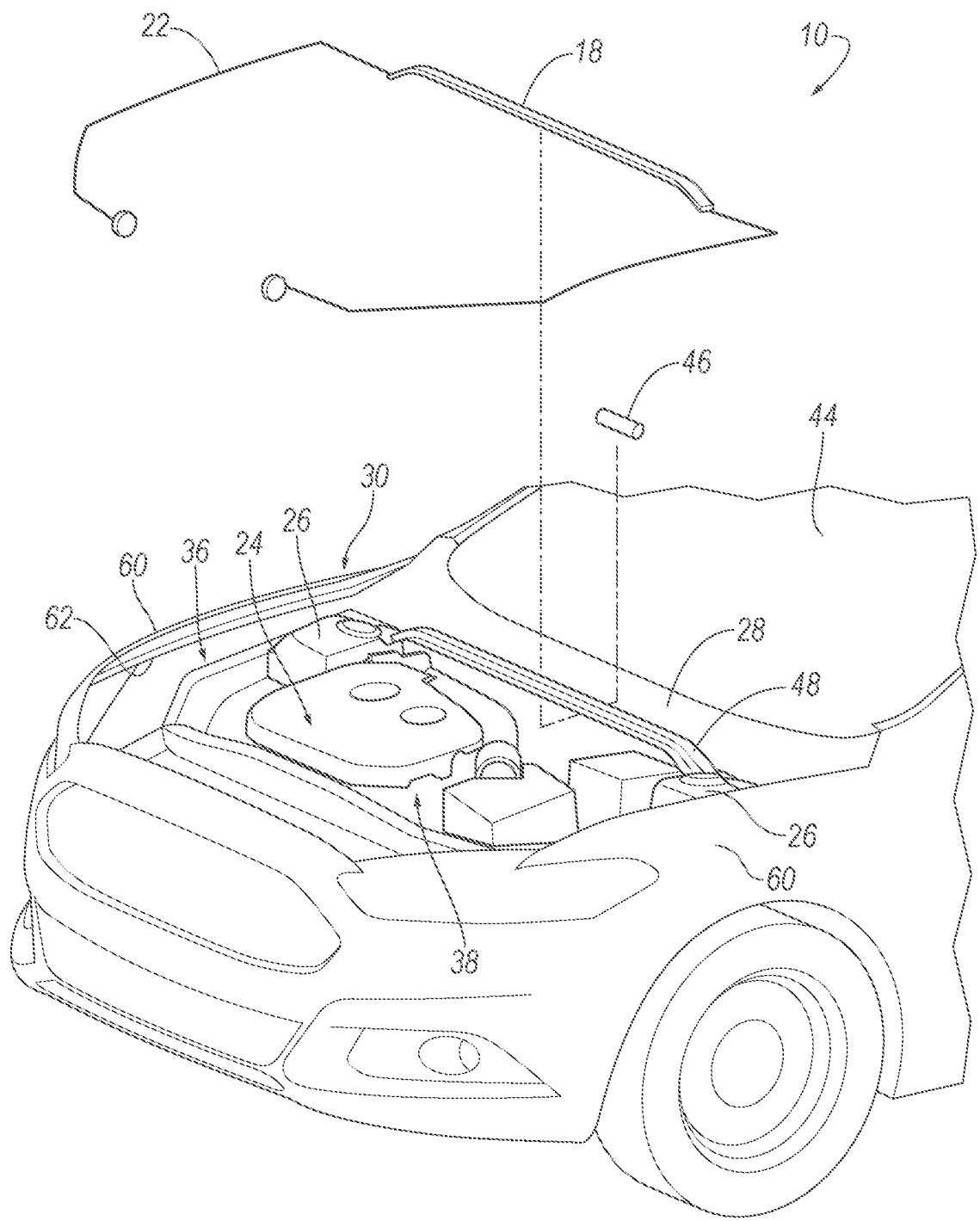
FIG. 2 is a perspective view of the vehicle with the hood removed and an airbag assembly exploded from a vehicle body of the vehicle.

The airbag 18 is disposed below the vehicle-rearward end 14 of the hood 12 and inflatable to the vehicle-forward end 16 below the hood 12. As shown in FIGS. 1 and 2, in the uninflated position the airbag 18 is disposed below the vehicle-rearward end 14 of the hood 12. Specifically, as described above, the airbag 18 in the uninflated position is fixed to the vehicle body 30 below the vehicle-rearward end 14 of the hood 12. As shown in FIG. 6, both the airbag 18 and the inflator 46 may be fixed to the vehicle body 30 below the vehicle-rearward end 14 of the hood 12. The airbag 18 and the inflator 46 in the figures, and specifically with reference to FIG. 6, are fixed to a cross-vehicle beam 48 of the vehicle body 30 that extends from one shock tower 26 to another shock tower 26.

The airbag 18 is inflatable in the powertrain compartment 36. Specifically, the airbag 18 is inflatable below the hood 12 between the hood 12 and vehicle components below the hood 12, e.g., vehicle-powertrain components 38. In some examples, including the example shown in the figures, the airbag 18 is inflatable between the hood 12 and the vehicle 10 engine 24. The airbag 18 is inflatable along the hood 12, e.g., along the inner panel 40 of the hood 12. The airbag 18 may be spaced from the hood 12 in the uninflated position (FIG. 6) and may abut the hood 12 in the inflated position.

The inflatable members 52 are inflatable to the inflated position. The inflatable members 52 in the inflated position may be elongated along longitudinal axes A1, as shown in FIG. 5. Each of the longitudinal axes A1 are centered on the respective inflatable member 52. The inflatable members 52 in the inflated position extend from the vehicle-rearward end 14 of the hood 12 to the vehicle-forward end 16 of the hood 12 along the longitudinal axes A1. In the example shown in the figures, each of the inflatable members 52 have a common length along the vehicle-longitudinal axis L. In other examples, the inflatable members 52 may have different lengths, e.g., to accommodate for packaging constraints in the powertrain compartment 36.

The inflatable members 52 in the inflated position may each define an inflation chamber 50, as shown in FIGS. 7-9. For example, each inflatable member 52 may be tubular in shape and surround their respective inflation chamber 50. For example, each of the inflatable members 52 in the inflated position may be circular in cross section, as shown in FIGS. 7-9. e.g., taken along a lateral axis A2 that is perpendicular to the longitudinal axes A1. The lateral axis A2 may extend along the cross-vehicle axis C, as shown in FIG. 4. The tubular shape of each inflatable member 52 may be elongated along the longitudinal axes A1.

The uninflatable panels 54 are not in fluid communication with the inflation chamber 50 and is not inflated when the inflation chamber 50 is inflated. In other words, the uninflatable panels 54 are separated from any inflation chambers 50 of the inflatable panels. The uninflatable panels 54 do not include a chamber inflatable by inflation medium.

The inflatable members 52 and the uninflatable members 52 are in an alternating arrangement with each other. The inflatable members 52 in the inflated position are elongated along the longitudinal axes A1, and the inflatable members 52 and uninflatable panels 54 are in the alternating arrangement along the lateral axis A2. For example, each uninflatable panel 54 may be disposed between a pair of inflatable members 52. The inflatable members 52 and uninflatable panels 54 are in the alternating arrangement along the lateral axis A2. For example, each uninflatable panel 54 may include a pair of edges spaced from each other along the lateral axis A2. One of the pair of edges may be secured to one of the inflatable members 52, and the other of the pair of edges may be secured to another of the inflatable members 52. The edges may extend along the longitudinal axes A1. When the inflatable members 52 are in the inflated position, the uninflatable panels 54 are external to the inflation chambers 50 of the inflatable members 52. When the inflatable members 52 are in the inflated position, the inflatable members 52 may pull the uninflatable panels 54 taught between each respective inflatable member 52. The inflatable members 52 may be connected to the uninflatable panels 54 by, for example, stitching, adhesive, welding, unitary formation, etc.

The inflatable members 52 in the inflated position are spaced from each other. The inflatable members 52 may be spaced from each other by a distance that is less than a width of a JAMA-JARI head form impactor. For example, the longitudinal axes A1 of adjacent inflatable members 52 may be spaced from each other by the distance that is less than a width of a JAMA-JARI head form impactor. For example, the spacing may be such that each of the adjacent members absorbs energy from the head form impactor. To put it another way, the spacing may be such that the head form impactor does not fit between the adjacent inflatable members 52, e.g., without being slowed by the adjacent inflatable members 52 before contacting windshield 74.

Each of the inflatable members 52 in the inflated position has a width W1, as shown in FIGS. 4-7. The width W1 may be along the lateral axis A2. The width W1 may be a diameter of the respective inflatable member 52.

Each of the uninflatable panels 54 may have a width W2. The width W2 may be along the lateral axis A2. The width W2 may be between where the uninflatable panel 54 is secured to the inflatable members 52, as shown in FIGS. 5-7, e.g., between the edges of the uninflatable panel 54. The width W2 of one of the uninflatable panels 54 is less than the W1 width of the one of the inflatable members 52. To put it another way, the width W1 of the inflatable members 52 may be greater than the width W2 of the uninflatable panels 54.

The inflatable members 52 and the uninflatable members 52 may be fabric. In the examples shown in the figures, the inflatable members 52 and the uninflatable members 52 are of the same type of fabric. As an example, the fabric may be a woven polymer fabric or any other material. As one example, the inflatable members 52 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

In some examples, one of the inflatable members 52 may be secured to one of the uninflatable panels 54 at a first location FL and to another of the uninflatable panels 54 at a second location SL spaced from the first location FL. For example, as shown in FIG. 7, the first location FL may be separated from the second location SL by 180 degrees of angular displacement relative to the circular cross section of the inflatable member 52. For example, as shown in FIG. 7, the first location FL may be spaced from the second location SL along the lateral axis A2.

In some of the examples, one of the inflatable members 52 may be secured to one of the uninflatable panels 54 and to another of the uninflatable panels 54 at a common location L. For example, as shown in FIGS. 8 and 9, the uninflatable panels 54 located on opposite sides of one of the inflatable members 52 may secure to such inflatable member 52 at the common location L. In the example shown in FIG. 8, the uninflatable panels 54 extend tangentially from the circular cross section of the inflatable member 52.

The airbag 18 may include a manifold 56 having a plurality of ports 58 with each port 58 being in fluid communication with one of the inflatable members 52. The inflator 46 is in communication with the manifold 56 and supplies inflation medium to the manifold 56, which supplies inflation medium to the inflatable members 52, to inflate the airbag 18 from the uninflated position to the inflated position.

The inflator 46 is in fluid communication with the inflatable members 52, e.g., via the manifold 56. The inflator 46 expands the inflatable members 52 with inflation medium, such as a gas, to move the airbag 18 from the uninflated position to the inflated position. As set forth above, the inflator 46 may be fixed to the vehicle body 30, e.g., the cross-vehicle beam 48. The inflator 46 may be, for example, a pyrotechnic inflator 46 that ignites a chemical reaction to generate the inflation medium, a stored gas inflator 46 that releases (e.g., by a pyrotechnic valve) stored gas as the inflation medium, or a hybrid.

The pyrotechnic actuator 20 and the tether 22 pull the airbag 18 in the inflated position toward the vehicle-forward end 16 of the hood 12. The pyrotechnic actuator 20 is disposed below the vehicle-forward end 16 of the hood 12 and the tethers 22 extend from the pyrotechnic actuator 20 to the airbag 18. In the example shown in the figures, the vehicle 10 includes two pyrotechnic actuators 20 and one tether 22 extending from each pyrotechnic actuator 20 to the airbag 18. In other examples, the vehicle 10 may include any suitable number of pyrotechnic actuators 20, i.e., one or more, and any suitable number of tethers 22, i.e., one or more, with any suitable number of tethers 22 associated with each pyrotechnic actuator 20.

The pyrotechnic actuator 20 is operatively engaged with the tether 22 to retract the tether 22. As the pyrotechnic actuator 20 retracts the tether 22, the tether 22 pulls the airbag 18 toward the vehicle-forward end 16 of the hood 12 in the inflated position. Specifically, the airbag 18 remains fixed to the vehicle body 30, e.g., the cross-vehicle beam 48, below the vehicle-rearward end 14 of the hood 12, and the tether 22 pulls an end of the airbag 18 to the vehicle-forward end 16.

The pyrotechnic device includes a pyrotechnic charge. The pyrotechnic charge is activated to activate the pyrotechnic device. The pyrotechnic charge is combustible to produce a gas. The pyrotechnic charge may be a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

The pyrotechnic device may be any suitable type such as a rotary actuator, in which a pyrotechnic charge rotates a shaft connected to the tether 22 such that the tether 22 wraps around the shaft; a piston linkage, in which the pyrotechnic charge for example, drives a piston attached to the tether 22; a ball-in-tube linkage, in which an pyrotechnic charge propels a ball or balls over a cogwheel connected to the tether 22; a mechanical linkage, in which a compressed spring attached to the tether 22 is released; or any other suitable type.

The pyrotechnic actuator 20 is fixed to the vehicle body 30, as set forth above. In the example shown in the figures, the pyrotechnic actuator 20 is fixed to the radiator mount 32 of the vehicle body 30 (FIGS. 1, 3, and 4). The pyrotechnic actuator 20 may be fixed to the vehicle body 30 with, for example, threaded fasteners, brackets, clips, etc.

The tether 22 extends from the pyrotechnic actuator 20 to the airbag 18. The tether 22 may be, for example, below the hood 12 from the pyrotechnic actuator 20 to the airbag 18. In the example shown in the figures, the tether 22 extends along a catwalk 62 of the fender 60 (FIGS. 1 and 2). The catwalk 62 is a flange of the fender 60 extending below the hood 12 when the hood is closed. In other examples, a portion of the tether 22 may extend below other components, e.g., below the fender 60 of the vehicle body 30 vehicle-outboard of the hood 12.

The tether 22 may be releasably connected to the vehicle body 30 between the actuator and the airbag 18. In other words, the tether 22 may be connected to the vehicle body 30 at a connection that is configured to release from the vehicle body 30 when the pyrotechnic actuator 20 pulls the tether 22. As an example, the tether 22 may be releasably connected to the vehicle body 30 with a clip, bracket, etc.

The tether 22 may be fabric. For example, the tether 22 may be of the same type of material as the airbag 18. The tether 22 is fixed to the airbag 18. As an example, the tether 22 may be fixed to the airbag 18 by being stitched, adhered, welded, unitary formation, etc. The tether 22 may be fixed, for example, to a vehicle-forward end 16 of the airbag 18 when the airbag 18 is inflated. The vehicle-forward end 16 of the airbag 18 may be rolled and/or folded with the rest of the airbag 18 in the uninflated position.

The vehicle 10 may include at least one impact sensor for sensing impact of the vehicle 10, and a computer in communication with the impact sensor and the inflator 46. The computer may activate the inflator 46, e.g., provide an impulse to a pyrotechnic charge of the inflator 46 when the impact sensor senses certain impact of the vehicle 10. Alternatively or additionally to sensing certain impacts, the impact sensor may be designed to sense certain impacts prior to impact, i.e., pre-impact sensing.

The impact sensor may be in communication with the computer. The impact sensor is designed to detect certain impacts to the vehicle 10. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor may be located at numerous points in or on the vehicle 10.

The computer, the inflator 46, and the impact sensor may be connected to a communication bus, such as a controller area network (CAN) bus, of the vehicle 10. The computer may use information from the communication bus to control the activation of the inflator 46. The computer is programmed to actuate the to inflators 46 to inflate the inflatable members 52.

The computer may be a microprocessor-based computer implemented via circuits, chips, or other electronic components. For example, the computer may include a processor, a memory, etc. The memory of the computer may include memory for storing programming instructions executable by the processor as well as for electronically storing data and/or databases.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle body;
   a hood having a vehicle-rearward end and a vehicle-forward end;
   an airbag fixed to the vehicle body in an uninflated position and an inflated position, the airbag being disposed below the vehicle-rearward end of the hood and inflatable to the vehicle-forward end below the hood from the uninflated position to the inflated position;
   a pyrotechnic actuator disposed below the vehicle-forward end of the hood;
   a tether extending from the pyrotechnic actuator to the airbag;
   a powertrain compartment directly beneath the hood, the airbag being inflatable in the powertrain compartment; and
   a vehicle engine in the powertrain compartment, the airbag being inflatable between the hood and the vehicle engine;
   the vehicle body including a fender extending along the powertrain compartment, the tether extending along the fender between the pyrotechnic actuator and the airbag, the tether being releasably connected to the fender.

2. The vehicle as set forth in claim 1, wherein the pyrotechnic actuator is fixed to the vehicle body.

3. The vehicle as set forth in claim 1, wherein the hood includes an inner panel and an outer panel and the airbag is below the inner panel.

4. The vehicle as set forth in claim 1, wherein the airbag is spaced from the hood in an uninflated position and abuts the hood in the inflated position.

5. The vehicle as set forth in claim 1, wherein the pyrotechnic actuator is fixed to the vehicle body.

6. The vehicle as set forth in claim 1, wherein the airbag in the inflated position is below a lowermost surface of the hood.

7. The vehicle as set forth in claim 1, wherein the airbag includes inflatable members inflatable to an inflated position and uninflatable panels in an alternating arrangement with the inflatable members.

8. The vehicle as set forth in claim 7, wherein each of the inflatable members has a width and each of the uninflatable panels has a width that is less than the width of any of the inflatable members.

9. The vehicle as set forth in claim 7, wherein the uninflatable panels are fabric.

10. The vehicle as set forth in claim 7, wherein the inflatable members in the inflated position are elongated along longitudinal axes, and the inflatable members and uninflatable panels are in the alternating arrangement along a lateral axis perpendicular to the longitudinal axis.

11. The vehicle as set forth in claim 10, wherein the lateral axis extends along a cross-vehicle axis.

12. The vehicle as set forth in claim 10, wherein the longitudinal axes extend from the vehicle-rearward end of the hood to the vehicle-forward end of the hood.

13. The vehicle as set forth in claim 7, further comprising a manifold having a plurality of ports, each port being in fluid communication with one of the inflatable members.

14. The vehicle as set forth in claim 13, further comprising an inflator in fluid communication with the manifold.

15. The vehicle as set forth in claim 14, wherein the inflator and the pyrotechnic actuator are fixed to the vehicle body.

* * * * *